(12) United States Patent
Franklin et al.

(10) Patent No.: US 11,963,524 B2
(45) Date of Patent: Apr. 23, 2024

(54) DUCK CALL DEVICE

(71) Applicant: Parting Waters, LLC, Novi, MI (US)

(72) Inventors: Daniel Franklin, Canfield, OH (US); Michael W. Maurer, Novi, MI (US)

(73) Assignee: Parting Waters, LLC, Novi, MI (US)

( * ) Notice: Subject to any disclaimer, the term of this patent is extended or adjusted under 35 U.S.C. 154(b) by 309 days.

(21) Appl. No.: 17/507,033

(22) Filed: Oct. 21, 2021

(65) Prior Publication Data

US 2022/0125036 A1 Apr. 28, 2022

Related U.S. Application Data

(60) Provisional application No. 63/104,697, filed on Oct. 23, 2020.

(51) Int. Cl.
  *A63H 5/00* (2006.01)
  *A01M 31/00* (2006.01)
  *G10K 9/02* (2006.01)

(52) U.S. Cl.
  CPC ............ *A01M 31/004* (2013.01); *A63H 5/00* (2013.01); *G10K 9/02* (2013.01)

(58) Field of Classification Search
  CPC .............................. A63H 5/00; A01M 31/004
  See application file for complete search history.

(56) References Cited

U.S. PATENT DOCUMENTS

| | | | | |
|---|---|---|---|---|
| 3,928,935 | A * | 12/1975 | Beadles, Jr. | A63H 5/00 446/208 |
| 5,910,039 | A * | 6/1999 | Primos | A01M 31/004 446/209 |
| 6,152,798 | A * | 11/2000 | Raburn | A01M 31/004 446/397 |
| 7,384,323 | B2 * | 6/2008 | Sceery | A01M 31/004 446/202 |
| 9,510,588 | B2 * | 12/2016 | Werth | G10K 5/00 |
| 9,848,596 | B2 * | 12/2017 | Betts | A01M 31/004 |
| 10,779,527 | B2 * | 9/2020 | Wilson | A01M 31/004 |
| 2020/0281189 | A1 * | 9/2020 | Nuessen | A01M 31/004 |

* cited by examiner

*Primary Examiner* — John A Ricci

(57) ABSTRACT

A duck call device includes a tone board having a tone surface and a tone board port defined, relative to airflow, behind the tone surface. The tone board port is divided into multiple channels to form a multi-channel port. A reed is located on the tone surface and is configured to vibrate there against. The multi-channel port may be created by a longitudinal central rib dividing a portion of the tone board port, wherein the longitudinal central rib contacts the reed while air is passing through the duck call device. The tone surface may surround a portion of the tone board port with recessed edges, and the central rib may have recessed edges.

9 Claims, 12 Drawing Sheets

SECTION B-B

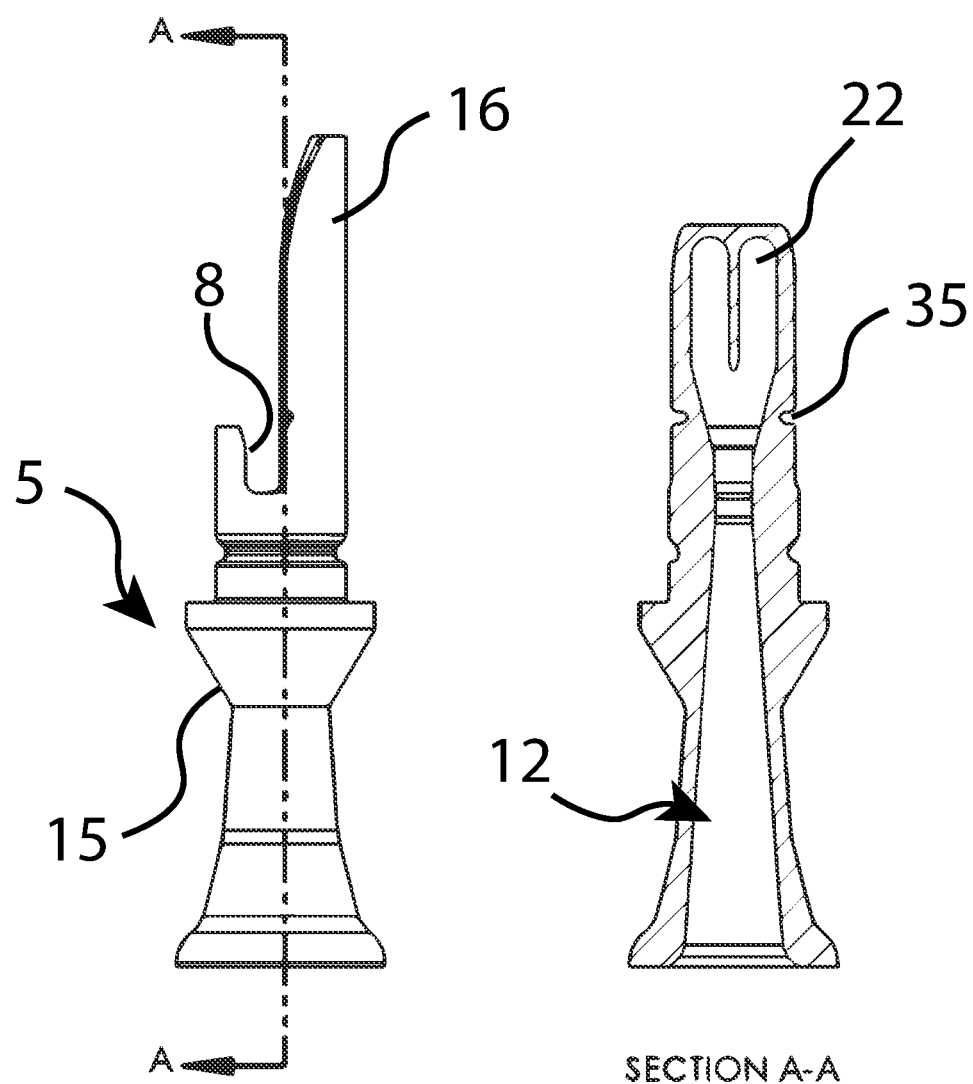

Fig. 12
Fig. 13
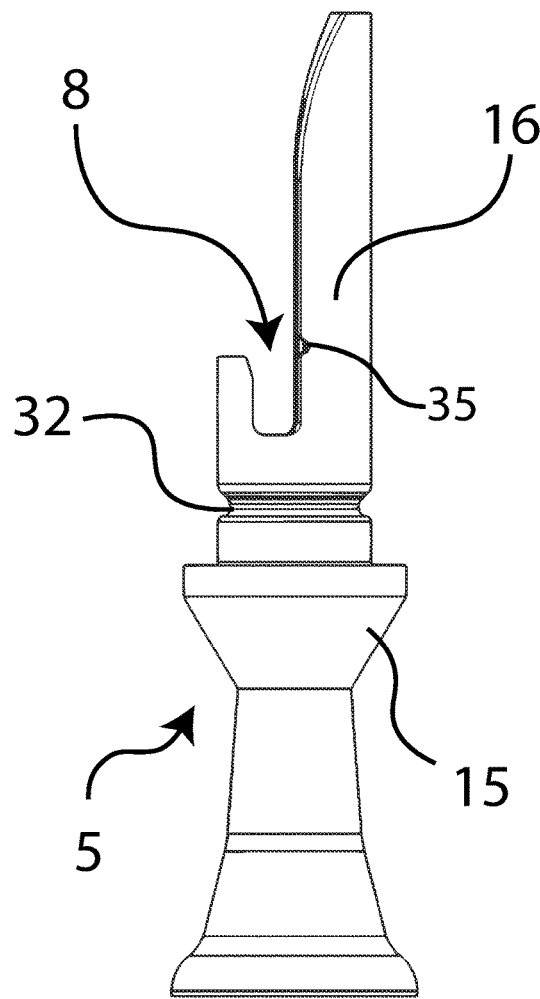
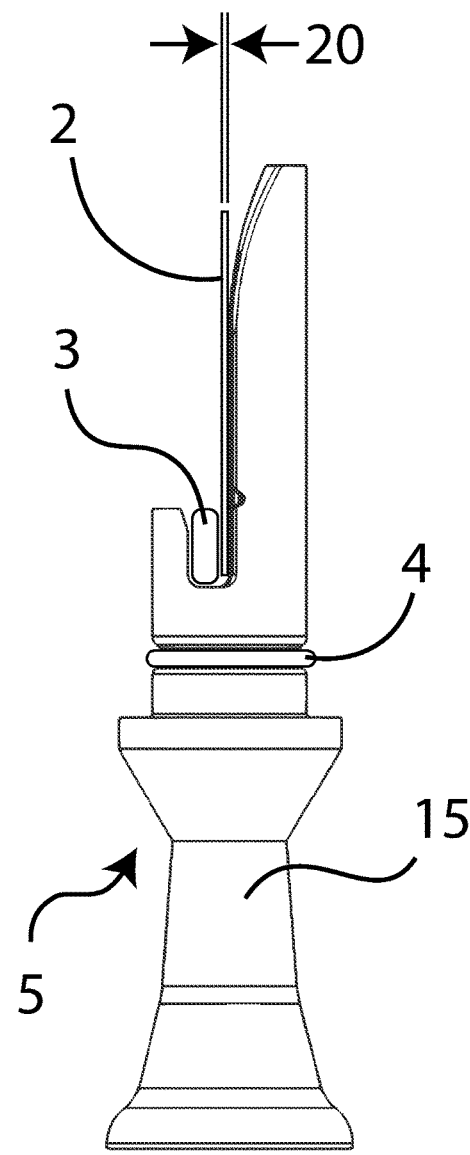

Fig. 14
Fig. 15
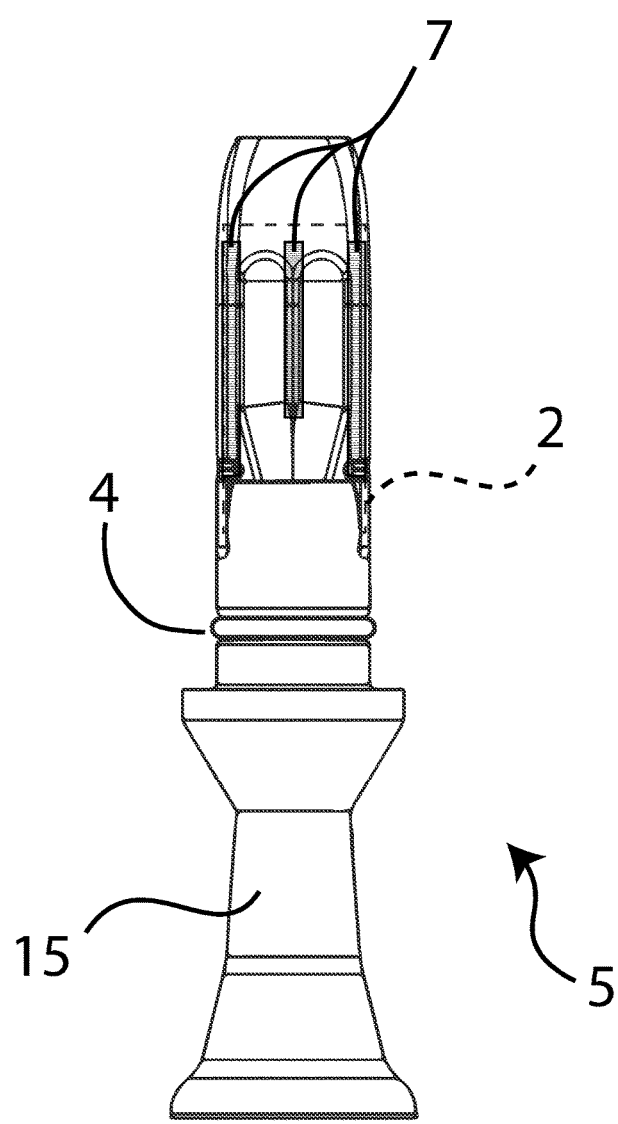
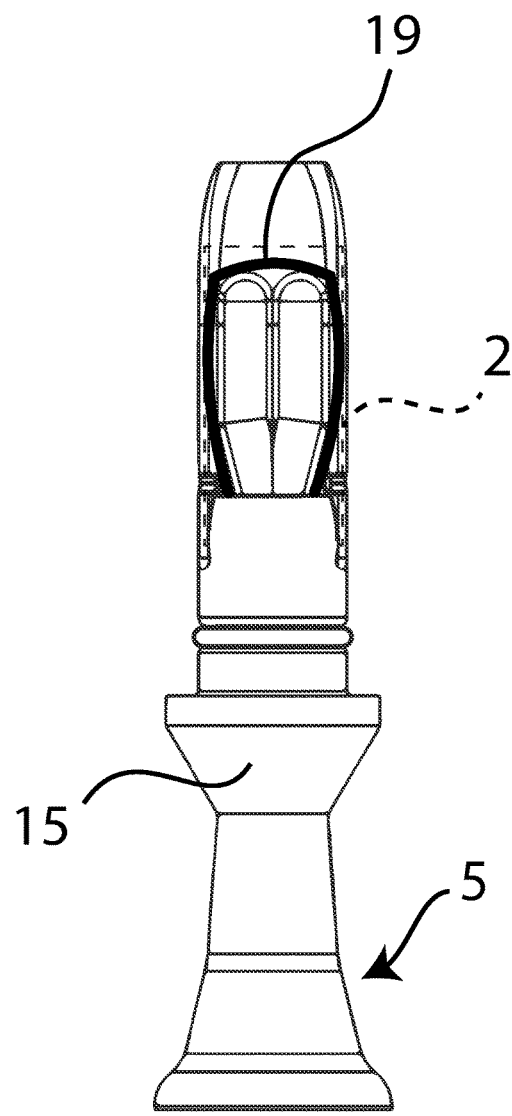

Fig. 19
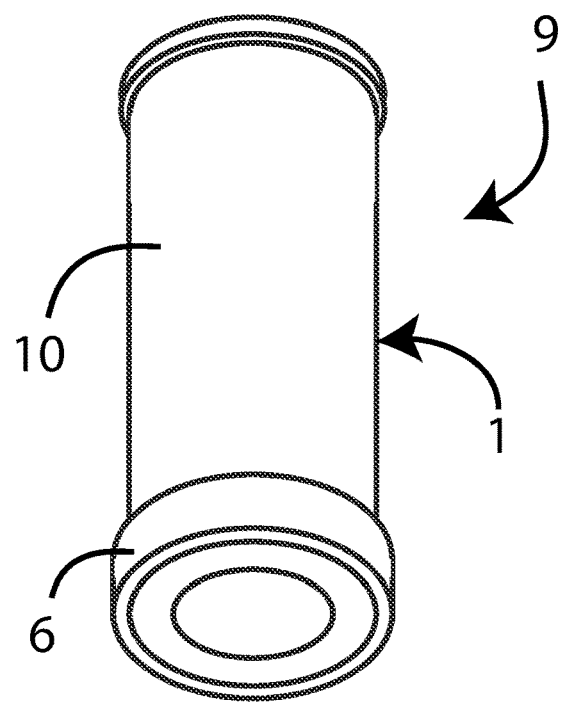
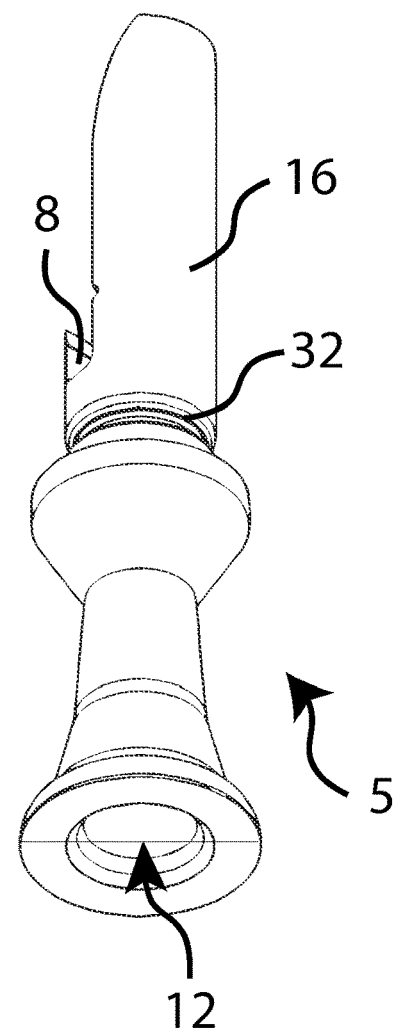

Fig. 20A
Fig. 20B
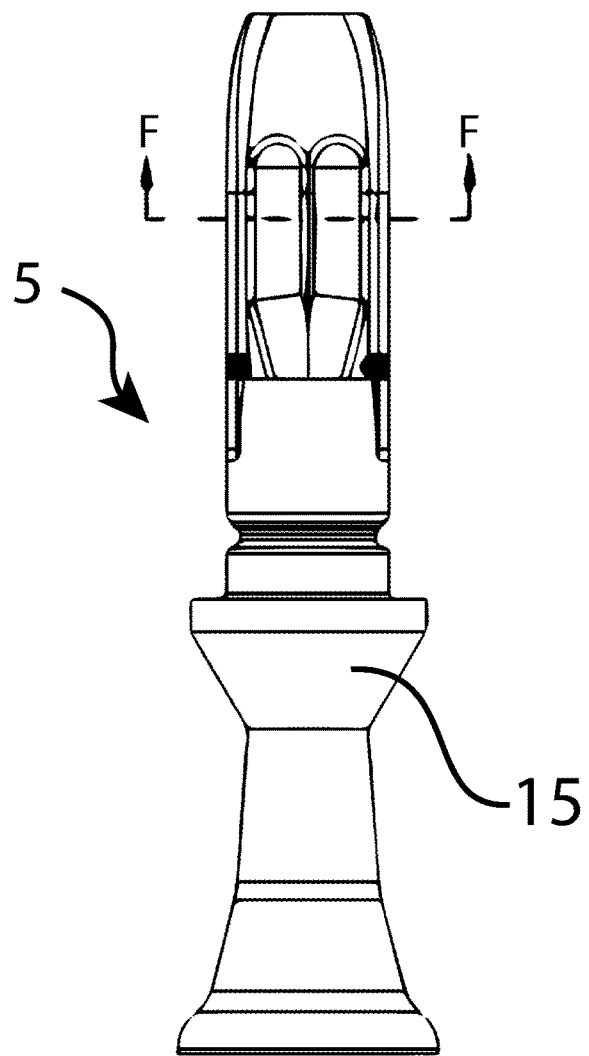
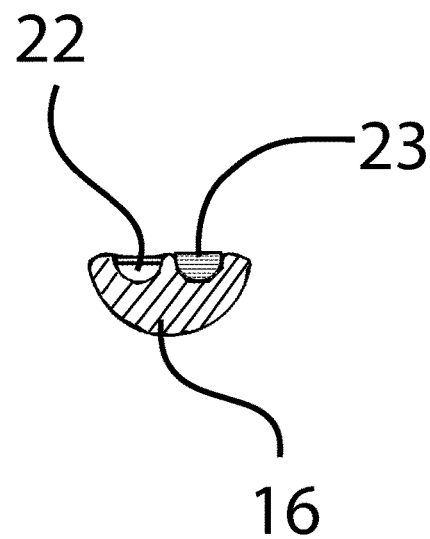

DUCK CALL DEVICE

CROSS-REFERENCE TO RELATED APPLICATIONS

This application claims the benefit of U.S. Provisional Application No. 63/104,697, filed Oct. 23, 2020, which is hereby incorporated by reference in its entirety.

INTRODUCTION

This disclosure generally relates to devices usable for calling wild game, including waterfowl.

SUMMARY

A duck call device is provided and includes several components and features. The duck call device includes a tone board having a tone surface and a tone board port defined, relative to airflow, behind the tone surface. The tone board port is divided into multiple channels to form a multi-channel port. A reed is located on the tone surface and is configured to vibrate there against.

The multi-channel port may be created by a longitudinal central rib dividing a portion of the tone board port, wherein the longitudinal central rib contacts the reed while air is passing through the duck call device. The tone surface may surround a portion of the tone board port with recessed edges, and the central rib may have recessed edges. At least one moisture trap groove may be defined in the tone surface.

A mouthpiece may surround the reed and a portion of the tone board, and the tone board defines an air exit port extending beyond, in the direction of airflow, the mouthpiece. The multi-channel port has two channels feeding into the exit port.

The above features and advantages, and other features and advantages, of the present disclosure are readily apparent from the following detailed description of some of the best modes and other embodiments for carrying out the disclosure, which is defined solely by the appended claims, when taken in connection with the accompanying drawings.

BRIEF DESCRIPTION OF THE DRAWINGS

FIG. 8 schematically illustrates a side view of the tone board assembly.

FIG. 9 schematically illustrates a section view of the tone board assembly taken along a line A-A of FIG. 8, showing portions of the tone board port.

FIG. 12 schematically illustrates a side view of the tone board assembly.

FIG. 13 schematically illustrates a side view of the tone board assembly with the reed inserted and held by a reed wedge.

FIG. 14 schematically illustrates a front view of the tone board assembly showing a tone surface interaction between the reed and a tone board shaft.

FIG. 15 schematically illustrates a front view of the tone board assembly showing a hydro-lock area that occurs in alternative duck call assemblies between the reed and the tone board shaft.

FIG. 19 schematically illustrates an exploded view of the duck call assembly showing the mouthpiece assembly attachable to the tone board assembly.

FIG. 20A schematically illustrates a front view of the tone board assembly showing the multi-channel port created by the central rib.

FIG. 20B schematically illustrates a section view of the tone board assembly taken along line F-F of FIG. 20A, showing the tone board port and highlighting one half of a hydraulic diameter, the area through which air flows through the tone board port.

DETAILED DESCRIPTION

Figure 17:
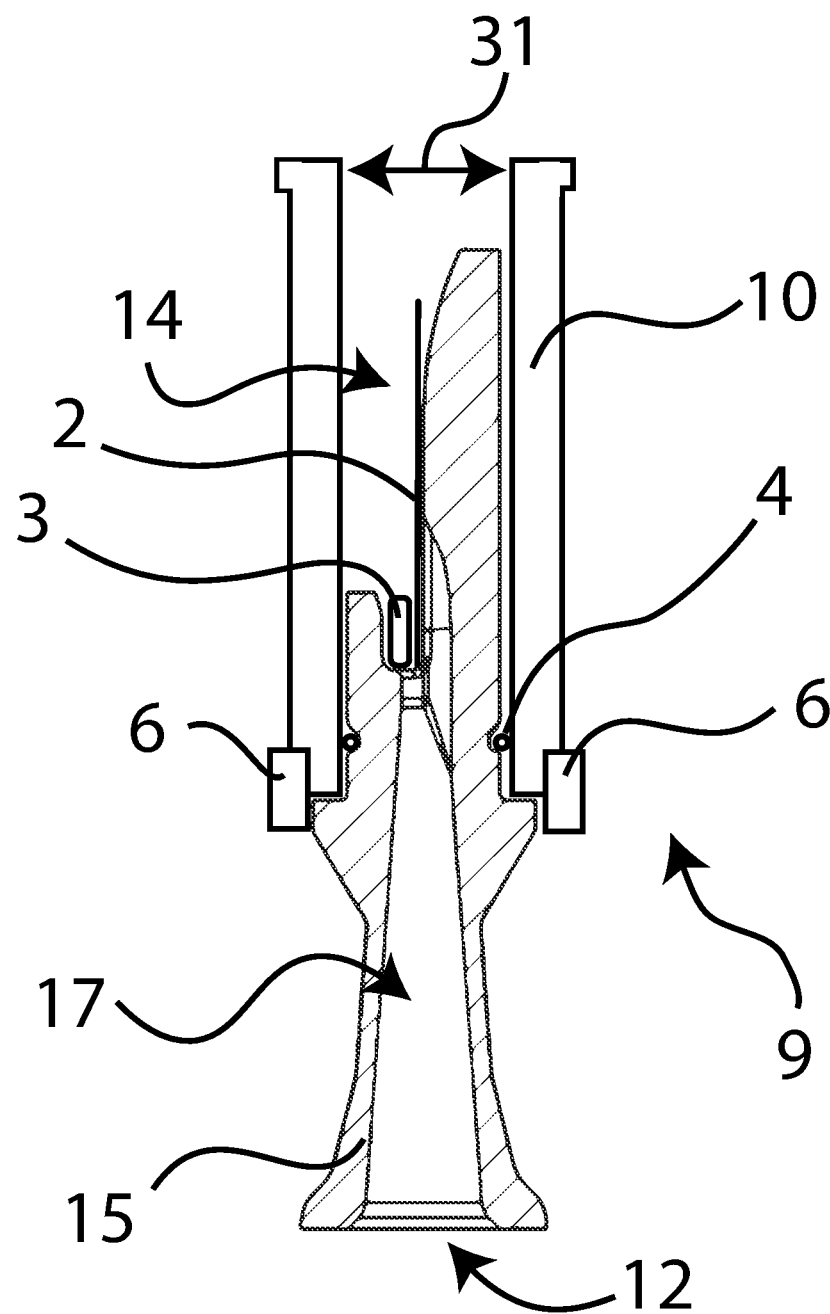
FIG. 17 schematically illustrates a partial cross section of the duck call assembly, showing the tone board assembly sectioned and the mouthpiece in plane intersection.

Referring to the drawings, like reference numbers correspond to like or similar components, wherever possible, throughout the several figures. All figures may be referred to in any section of the specification, without regard to numerical order, and the description regularly refers to more than one figure at a time. The figures schematically illustrate various views of a duck call assembly 9. As best viewed in FIGS. 17, 18, and 19, the duck call assembly 9 (shown in partial cross section views and exploded view) is assembled by sliding a mouthpiece assembly 1, or simply mouthpiece 1, over a tone board assembly 5.

While the present disclosure may be illustrated with respect to particular industries or applications, those skilled in the art will recognize the broader applicability of the products, methods, and techniques, described herein. For example, similar structures, methods, or combinations thereof, may be used in other industries than those described herein.

Those having ordinary skill in the art will also recognize that terms such as "above," "below," "upward," "downward," et cetera, are used descriptively of the figures, and do not represent limitations on the scope of the appended claims. Any numerical designations, such as "first" or "second" are illustrative only and are not intended to limit the scope of the claims in any way.

When used herein, the term "substantially" refers to relationships that are ideally perfect or complete, but where manufacturing realities prevent absolute perfection. Therefore, substantially denotes typical variance from perfection in the relevant art. For example, if height A is substantially equal to height B, it may be preferred that the two heights are 100.0% equivalent, but manufacturing realities likely result in the distances varying from such perfection. Skilled artisans would recognize the amount of acceptable variance. For example, and without limitation, coverages, areas, or distances may generally be within 10% of perfection for substantial equivalence. Similarly, relative alignments, such as parallel or perpendicular, may generally be within 5%.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting.

The mouthpiece assembly 1 is where air is applied to the duck call assembly 9. In some applications, a band 6 is pressed onto a mouthpiece base 10. The band 6 is generally for aesthetic purposes and may also ensure that a mouthpiece inner diameter 31 is tightly fit against the tone board assembly 5, which may simply be referred to as tone board 5.

The band 6 and the mouthpiece assembly 1 squeeze an O-ring 4. A tight fit between the mouthpiece assembly 1 and tone board assembly 5 may be important for sound and function—i.e., the tight fit limits both air leakage and unintentional separation of the components.

The tone board assembly 5 is a complex portion of the duck call assembly 9. Air enters the duck call assembly 9 via the mouthpiece assembly 1, passes through a reed 2, and exits via an air exit port 12, creating the desired duck-like sound. The reed 2 sits on a tone surface 7 (best viewed in FIG. 14) of the tone board assembly 5. A reed wedge 3 may be pressed into a reed channel 8 to assist in fixing the placement of the reed 2 relative to the tone surface 7.

Note that the reed 2 may be a single reed or may be multiple reeds, such that the duck call assembly 9 may use either a single reed, double reed, or more. Using the reed wedge 3 allows for adjustability of the reed 2 on the tone surface 7, the adjustability affects pitch and sound of the call. The O-ring 4 is pressed onto an area between a tone board base 15 and a tone board shaft 16 in a groove called an O-ring channel 32.

To use the duck call assembly 9, the mouthpiece 1 is placed to a user's lips, creating applied pressure 29. As the user blows into the mouthpiece 1, back pressure 13 is created in an air cavity 14, which is the substantially sealed air space created by the mouthpiece 1 sliding over the tone board assembly 5. The air cavity 14 is sealed by the O-ring 4 and, also, by the user's mouth.

Figure 18:
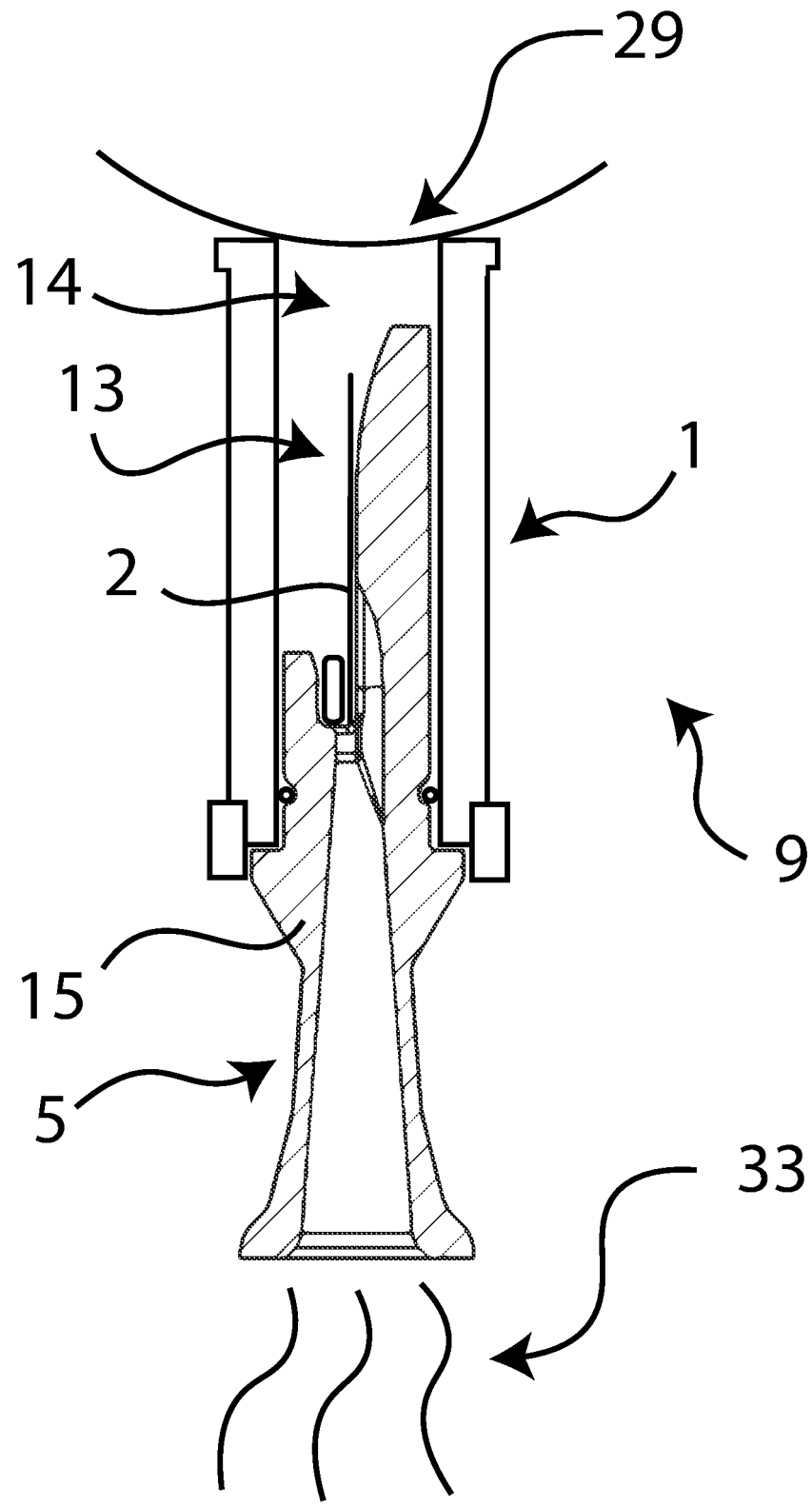
FIG. 18 schematically illustrates a similar view to FIG. 17, illustrating airflow through the duck call assembly.

As the back pressure 13 increases, air eventually escapes under the reed 2 through a tone board port 22 and a tone board exit 17, which creates exit air 33 (as best viewed in FIG. 18). Passage of the exit air 33 between the reed 2 and the tone board port 22 causes the reed 2 to vibrate.

Different sounds can be made with different applied pressures 29 from the user. Furthermore, the user may also apply their hand to alter the effective area of the air exit port 12, thus altering or affecting pressure of the exit air 33 and the sound, tone, or both, of the call created. Airflow generally occurs between the applied pressure 29 and the exit air 33, as viewed in FIG. 18.

In the duck call assembly 9, the reed 2 design may be changed to alter the sound. A reed thickness 20 and a reed width 21 may be tuned to deliver the desired pitch and sound of the duck call. The reed tuning is also dependent on the shape and size of the tone surface 7 and of the tone board port 22—or, in the configuration shown, the two tone board ports 22 forming a multi-channel port 26 having at least two portions. Alternative designs may have three channels for the multi-channel port 26. The length of the reed 2 may also be changed, and the duck call assembly 9 can accommodate substantially any length of reed 2.

Any sizes given herein are exemplary only, provide sample dimensions, and do not limit the scope of the claimed disclosure. For example, the reed width 21 may be approximately ⅝ inches for the preferred sound. Smaller sizes may limit the tone range, because the reed 2 may be less likely to vibrate as often or as well. Furthermore, reed thickness 20 was found to have the preferred sound at approximately 0.007 inches, but thicknesses may range between, without limitation: 0.005-0.014 inches.

The tone board port 22 may also be designed to better control pitch and sound of the duck call assembly 9. The sound is dependent on a hydraulic diameter 23, half of which is shown in the view of Section FF of FIG. 20B, and is the total cross-sectional area of the holes through which air flows between the reed 2 and the tone board port 22 on its way to the tone board exit 17.

The back pressure 13 created by the user eventually flows through the hydraulic diameter 23. If the hydraulic diameter 23 is too large, little or no back pressure 13 is created, the reed 2 will not vibrate, or vibrates too little, and air flows freely through the tone board exit 17. If the hydraulic diameter 23 is too small, the user may need to create larger back pressure 13 to vibrate the reed 2, making it difficult to control sound. In some situations, the hydraulic diameter 23 could be so small that no amount of back pressure 13 will cause the reed 2 to vibrate.

A single-channel tone board port is standard for alternative duck calls. The single-channel port requires a wide, shallow port to achieve the target horizontal overlap and hydraulic diameter 23. In such a design, the single-channel tone board port is very wide and the alternative reed bends or flexes greatly across the wide port such that it cannot create a consistent sound.

Figure 1:
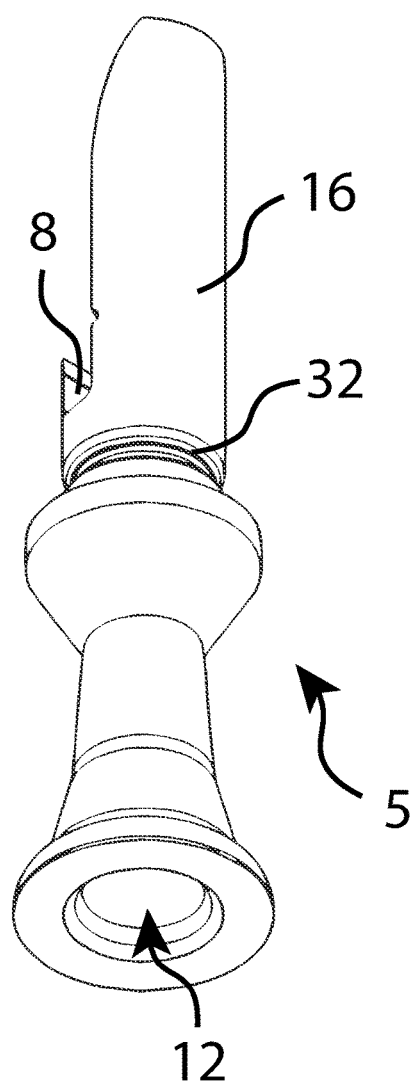
FIG. 1 schematically illustrates an isometric view of a portion of a tone board assembly for a duck call assembly.
Figure 2:
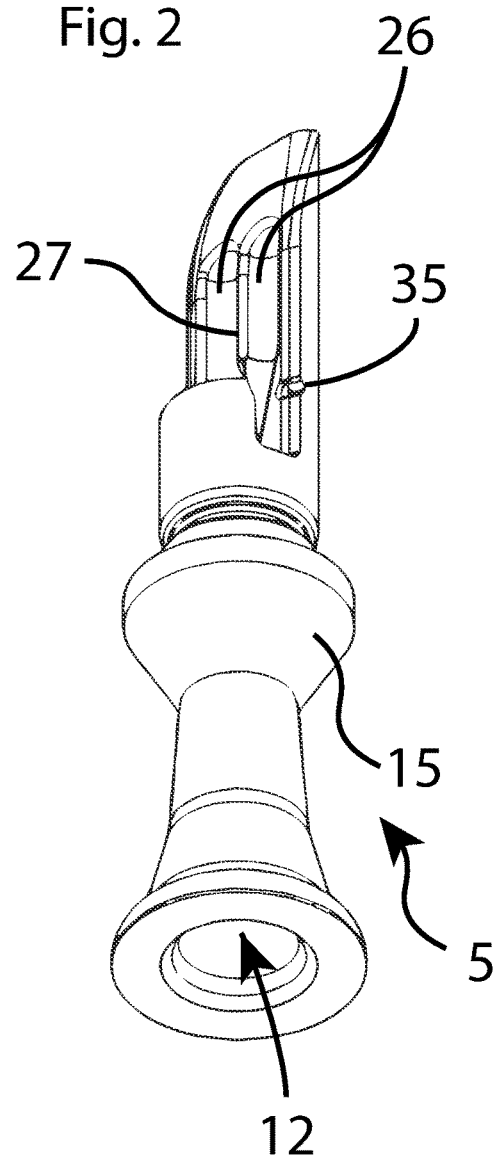
FIG. 2 schematically illustrates another isometric view of the tone board assembly.
Figure 3:
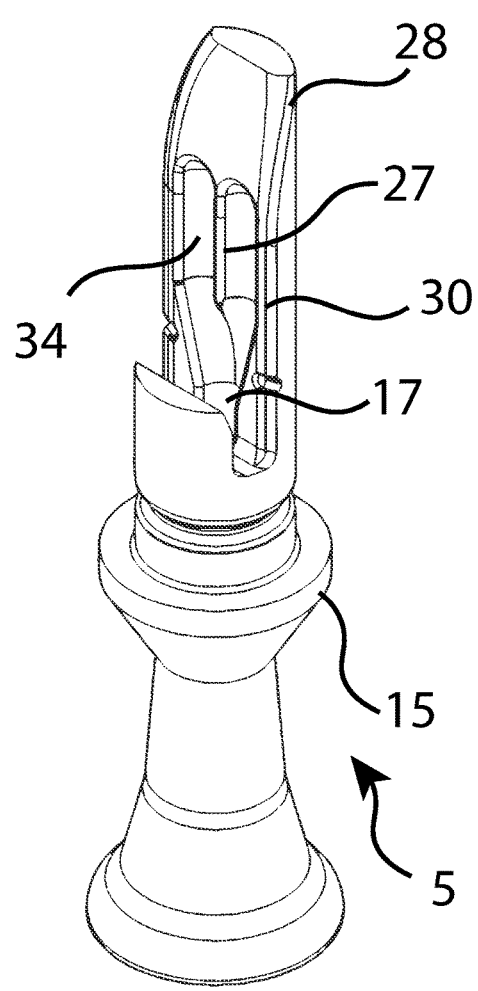
FIG. 3 schematically illustrates another isometric view of the tone board assembly showing a multi-channel port tone board port and several recessed edges.
Figure 4:
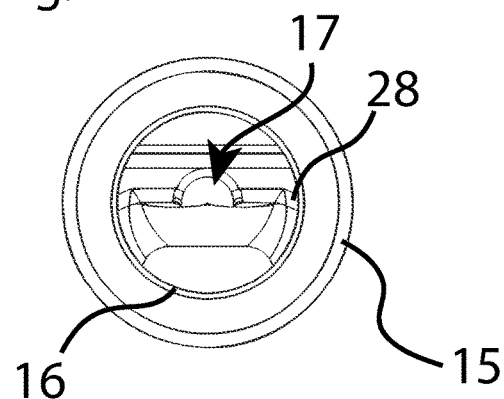
FIG. 4 schematically illustrates a top view of the tone board assembly.
Figure 5:
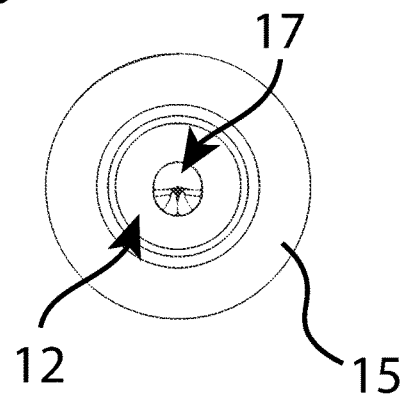
FIG. 5 schematically illustrates a bottom view of the tone board assembly.
Figure 6:
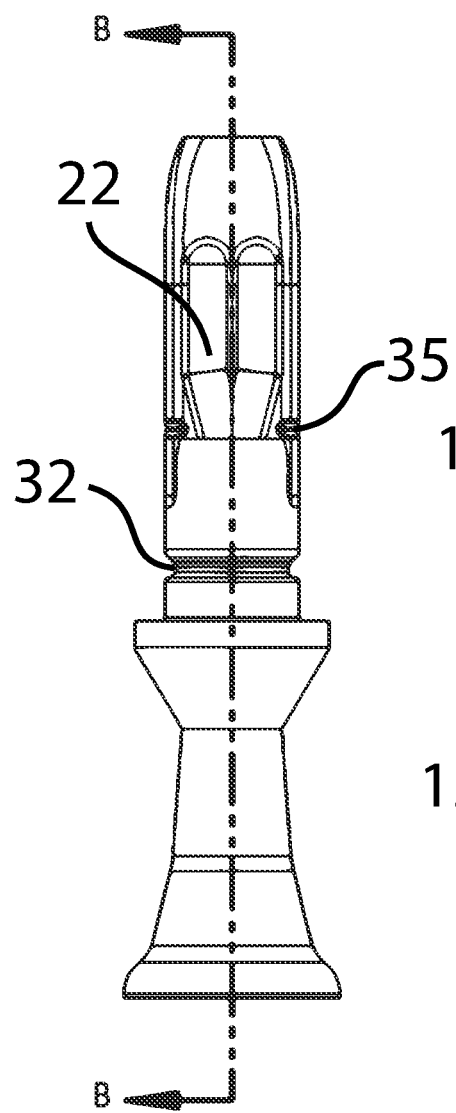
FIG. 6 schematically illustrates a front view of the tone board assembly.
Figure 7:
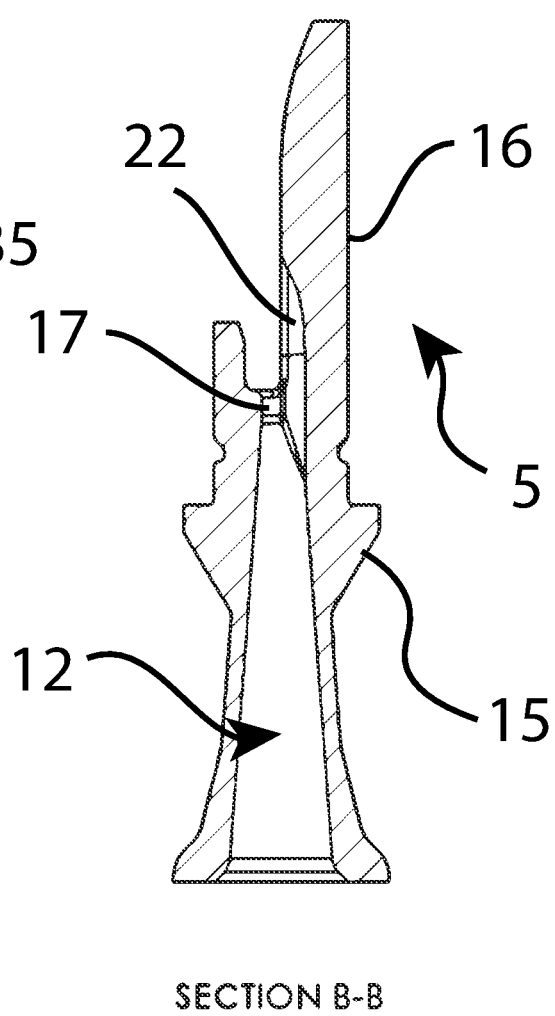
FIG. 7 schematically illustrates a section view of the tone board assembly taken along a line B-B of FIG. 6.
Figure 10:
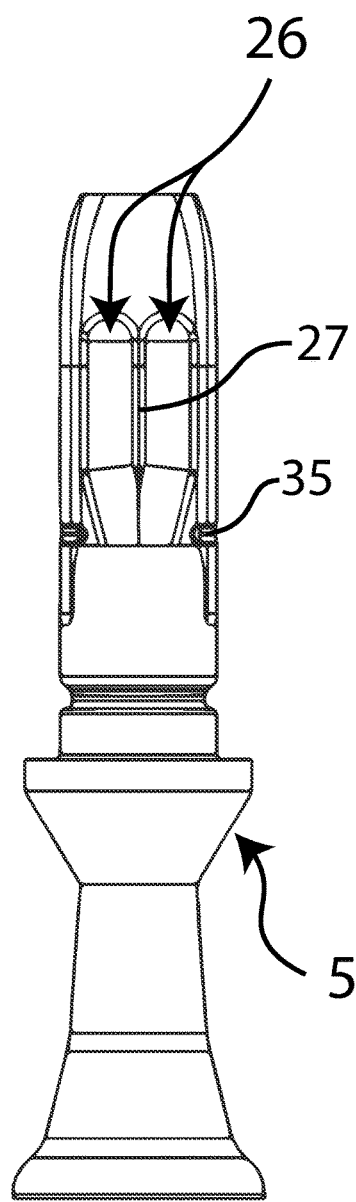
FIG. 10 schematically illustrates a front view of the tone board assembly showing the multi-channel port created by a central rib, in addition to moisture traps that reduce hydraulic locking.
Figure 11:
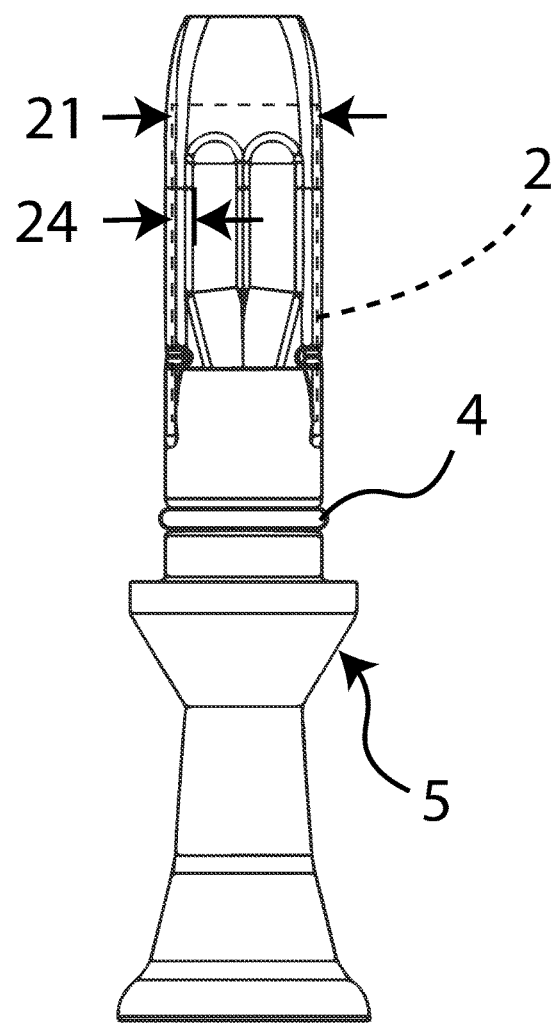
FIG. 11 schematically illustrates a front view of the tone board assembly showing overlap of a reed with the multi-channel port.
Figure 16:
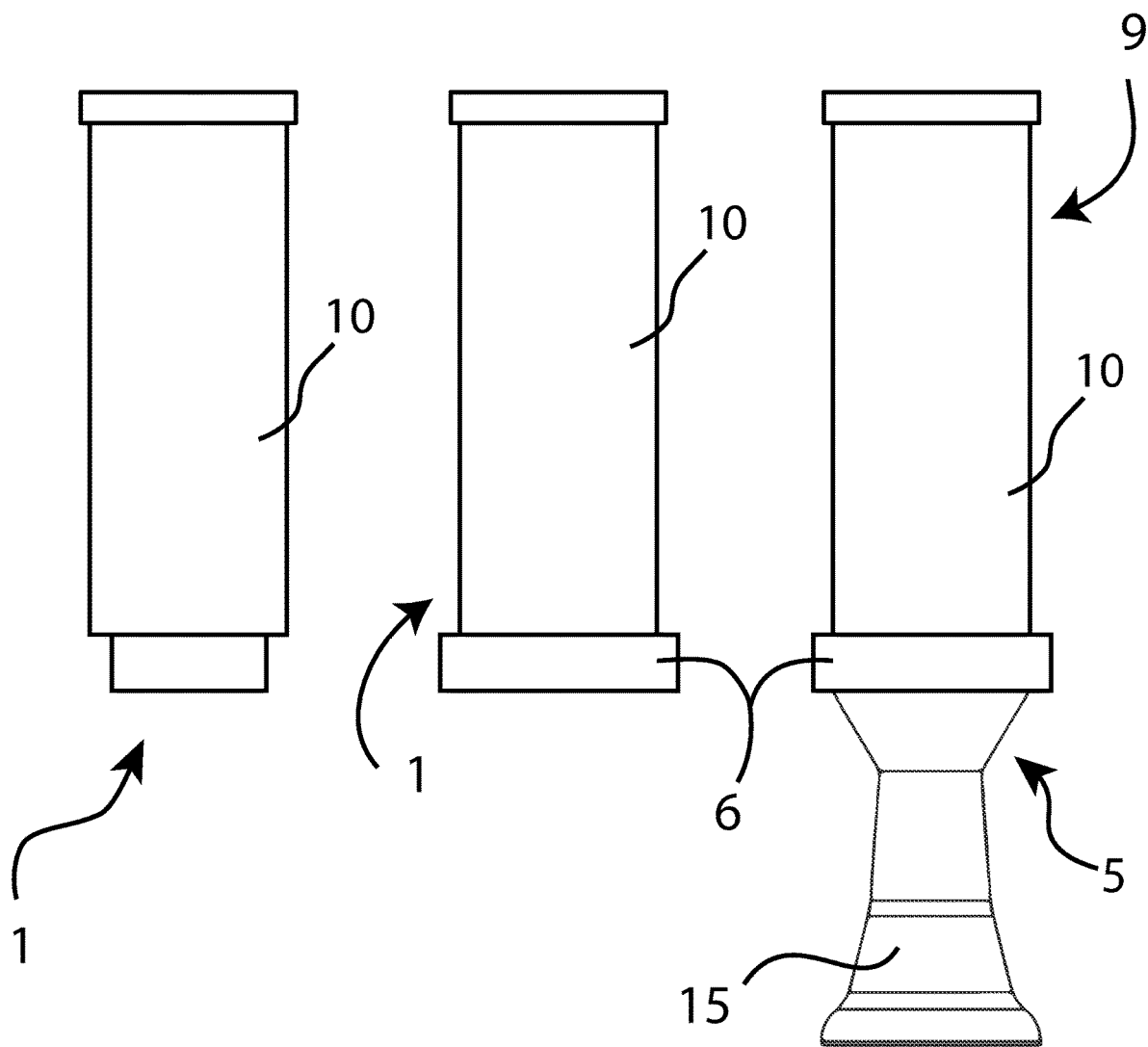
FIG. 16A schematically illustrates a front view of a mouthpiece.
FIG. 16B schematically illustrates a front view of the mouthpiece having a band installed.
FIG. 16C schematically illustrates a front view of the duck call assembly having the mouthpiece installed to the tone board assembly.

The multi-channel port 26 was created to address this issue and is formed by a central rib 27 that longitudinally divides portions of the tone board port 22. As viewed in FIGS. 10 and 11, a longitudinal axis runs upward and downward and a horizontal axis runs leftward and rightward. In alternative configurations of the duck call assembly 9, the central rib 27 may be located lower in the tone board port 22, such that the central rib 27 does not touch the very top of the tone board port 22 (as viewed in FIGS. 10 and 11).

The central rib 27 allows for the proper hydraulic diameter 23, sufficient target horizontal overlap 24, and provides sufficient support for the reed 2 along its longitudinal edges and middle. The two channels of the multi-channel port 26 feed into the tone board exit 17. The illustrated design also gives the reed 2 three contact points, which are substantially linear, with the tone surface 7, instead of two contact points that would be result from a single-channel design.

For example, and without limitation, the total width across the two hydraulic diameter 23 portions of the multi-channel port 26 may be between 0.15-0.25 inches and the area of the hydraulic diameter 23 may be between 0.010-0.020 inches squared, both of which are comparable to single-channel ports. In one exemplary duck call assembly 9, the total width and area may be, respectively, 0.19 inches and 0.014 inches squared. Note that the multi-channel port 26 maintains improved sound performance relative to the single-channel port, in part because the central rib 27 prevents the reed 2 from flexing greatly across the wide single-channel port of alternative duck calls.

There are several possible problems with alternative duck call designs. As the duck call assembly 9 is used, moisture from the user's mouth and/or outside weather conditions can enter the duck call assembly 9. Moisture between the reed 2 and a tone surface 7 can create a seal, preventing the reed 2 from vibrating on the tone surface 7. This is often called hydro lock, where moisture in a hydro-lock area 19, or simply area 19, sticks the reed 2 to the tone surface 7 and prevents vibration of the reed 2. Hydro lock is a very common issue with alternative duck call devices but is overcome by the features of the duck call assembly 9.

In an effort to maximize sound range and flexibility, minimize back pressure 13, and to prevent hydro locking along the hydro-lock area 19, the unique tone board port 22 design was created with the multi-channel port 26. This was created by maintaining the total hydraulic diameter 23—which is substantially equivalent to a single-channel tone board port—and optimizing the horizontal overlap 24 with the multi-channel port 26 design.

Minimizing the horizontal overlap 24 of reed 2 to the tone surface 7 helps prevent hydro lock in the hydro-lock area 19, in the duck call assembly 9. However, sufficient horizontal overlap 24 is required to provide the desired sound quality. Applicant's testing has shown that, without limitation, approximately 0.125 inches is the preferred horizontal overlap 24 distance. The ultimate design of the duck call assembly 9 minimizes the tone surface 7, while providing the reed 2 an adequate vibration surface, and allows substantially no leaks to the tone board port 22.

The duck call assembly 9 includes several other improvements relative to alternative duck call devices. To further reduce contact between the reed 2 and the tone surface 7, one or more chamfered edges 28 were added to the edges, or exterior walls 34 of the tone board port 22, and along the central rib 27, such that the tone surface 7 is largely surrounded by chamfered edges 28. This also allows the back pressure 13 to apply more pressure to the underside of the reed 2, improving sound quality and reducing the tendency toward hydro lock in the hydro-lock area 19.

Therefore, the tone board port 22 includes one or more recessed edges, which may be chamfered, filleted, or otherwise backed away from the reed 2 to limit contact between the recessed edges and the reed 2. The recessed edges generally create substantially linear, or singular, contact areas between the reed 2 and the tone surface 7, as illustrated in FIG. 14.

Another recessed edge was created with a fillet feature applied to both outer edges of the tone surface 7—substantially along the exterior walls 34 of the tone board port 22—further reducing the tone surface 7, this may be referred to as a rounded reed contact area 30. This allows for one, substantially linear, point of contact between the outer edges of the reed 2 and the tone surface 7, as opposed to the large contact area of a substantially flat tone surface. The chambered edges 28 and the rounded reed contact area 30 are two examples of recessed edges in the duck call assembly 9. This provides improved protection against hydro lock in area 19, reduced back pressure 13, and a capability to produce a wider range of sound and tone.

Additionally, at least one moisture trap 35 is formed by a small groove perpendicular to the tone board port 22 on the outboard edge of the tone board shaft 16 or the tone surface 7. In the example shown, there are two moisture traps 35, but additional or fewer moisture traps 35 may be formed at or near the tone surface 7. When moisture is trapped between the reed 2 and tone surface 7, the reed 2 can have hydro lock in the area 19. However, the moisture trap 35 breaks the seal created by moisture in the hydro-lock area 19 on the outer edge of the reed 2, which helps prevent hydro lock by drawing moisture into the moisture trap 35 and away from the reed 2 and the tone surface 7.

The detailed description and the drawings or figures are supportive and descriptive of the disclosure. While some of the best modes and other embodiments for carrying out the disclosure have been described in detail, various alternative designs, configurations, and embodiments exist for practicing the appended claims, as will be recognized by those having ordinary skill in the art.

Furthermore, any embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A duck call device, comprising:
   a tone board having:
   a tone surface; and
   a tone board port defined, relative to airflow, behind the tone surface and divided into multiple channels to form a multi-channel port; and
   a reed located on the tone surface and configured to vibrate there against;
   wherein the multi-channel port is created by a longitudinal central rib dividing a portion of the tone board port, wherein the longitudinal central rib contacts the reed while air is passing through the duck call device, and
   wherein the tone surface surrounds a portion of the tone board port with recessed edges.

2. The duck call device of claim 1,
   wherein the longitudinal central rib has recessed edges.

3. The duck call device of claim 2, further comprising:
   at least one moisture trap groove defined in the tone surface.

4. The duck call device of claim 3, further comprising:
   a mouthpiece surrounding the reed and a portion of the tone board, and
   wherein the tone board defines an air exit port extending beyond, in the direction of airflow, the mouthpiece.

5. The duck call device of claim 4,
   wherein the multi-channel port has two channels feeding into the exit port.

6. The duck call device of claim 1, further comprising:
   at least one moisture trap groove defined behind the tone surface, relative to airflow.

7. A duck call device, comprising:
   a tone board having:
   a tone surface;
   a multi-channel tone board port defined, relative to airflow, behind the tone surface;
   a central rib within the multi-channel tone board port; and
   an air exit port;

a reed located on the tone surface and configured to vibrate there against;

a mouthpiece surrounding the reed and a portion of the tone board, wherein the air exit port extends beyond, in the direction of airflow, the mouthpiece; and two moisture trap grooves defined behind the tone surface, relative to airflow, and wherein the central rib has chamfered edges.

8. The duck call device of claim 7, wherein the tone surface surrounds the tone board port with chamfered edges.

9. A duck call device, comprising:

a tone board having:

a tone surface;

a tone board port defined, relative to airflow, behind the tone surface; and at least one moisture trap groove defined behind the tone surface, relative to airflow;

a reed located on the tone surface and configured to vibrate there against; and a mouthpiece surrounding the reed and a portion of the tone board, wherein an air exit port extends beyond, in the direction of airflow, the mouthpiece, and wherein the tone board port is surrounded by recessed edges.

* * * * *